United States Patent [19]

Swemer

[11] Patent Number: 5,042,894

[45] Date of Patent: Aug. 27, 1991

[54] FIBER OPTIC LIGHTING SYSTEM

[76] Inventor: Gerry E. Swemer, 4699 S. Valley View Blvd., Las Vegas, Nev. 89103

[21] Appl. No.: 488,110

[22] Filed: Mar. 5, 1990

[51] Int. Cl.$^5$ .............................................. G02B 6/00
[52] U.S. Cl. ..................................... 385/33; 385/901; 362/32
[58] Field of Search ............ 362/32; 350/96.10, 96.15, 350/96.20, 96.24, 96.25

[56] References Cited

U.S. PATENT DOCUMENTS

| | | | |
|---|---|---|---|
| 3,626,170 | 12/1971 | Schwan | 350/96.24 X |
| 4,025,779 | 5/1977 | Ahroni | 362/32 |
| 4,113,347 | 9/1978 | Gaertner | 350/96.24 |
| 4,234,910 | 11/1980 | Price | 350/96.10 X |
| 4,297,000 | 10/1981 | Fries | 350/96.24 |
| 4,511,755 | 4/1985 | Mori | 136/246 |
| 4,613,931 | 9/1986 | Messinger | 362/373 |
| 4,677,531 | 6/1987 | Szeles | 362/32 |
| 4,715,700 | 12/1987 | Daniel | 350/96.10 X |
| 4,717,227 | 1/1988 | Mori | 350/96.10 |
| 4,738,510 | 4/1988 | Sansom | 350/96.25 |

Primary Examiner—John D. Lee
Attorney, Agent, or Firm—Dowell & Dowell

[57] ABSTRACT

A fiber optic lighting system suitable for signs such as road and highway signs as well as other commercial uses and which includes a plurality of fresnel lenses which are recessed within openings through the front of a housing and which are aligned in space relationship from the tips of a plurality of optical fibers that are positively aligned and secured within the housing using a plastic shield which ensures proper positioning of the optical fibers to locate light emitted from the fibers at the proper focal distance to the fresnel lenses.

18 Claims, 4 Drawing Sheets

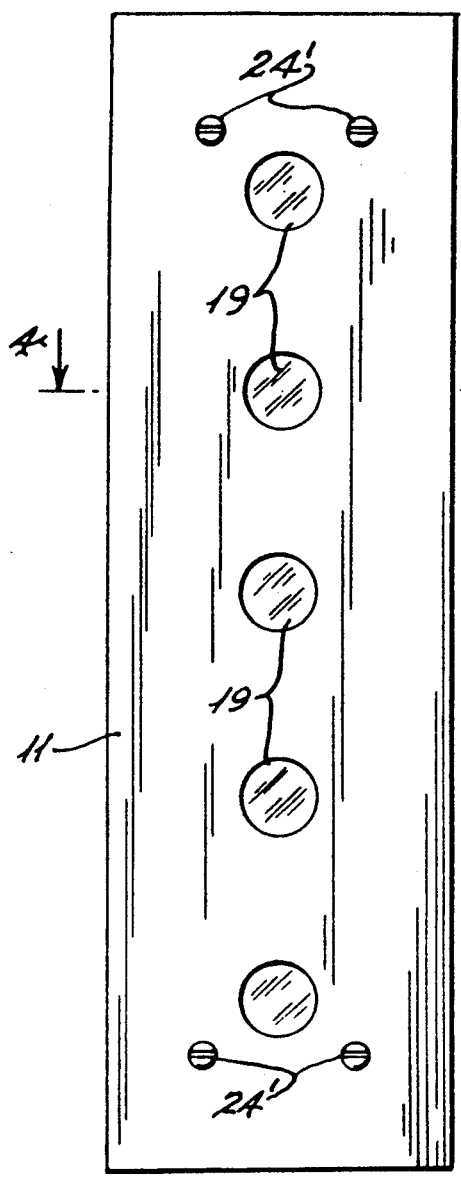
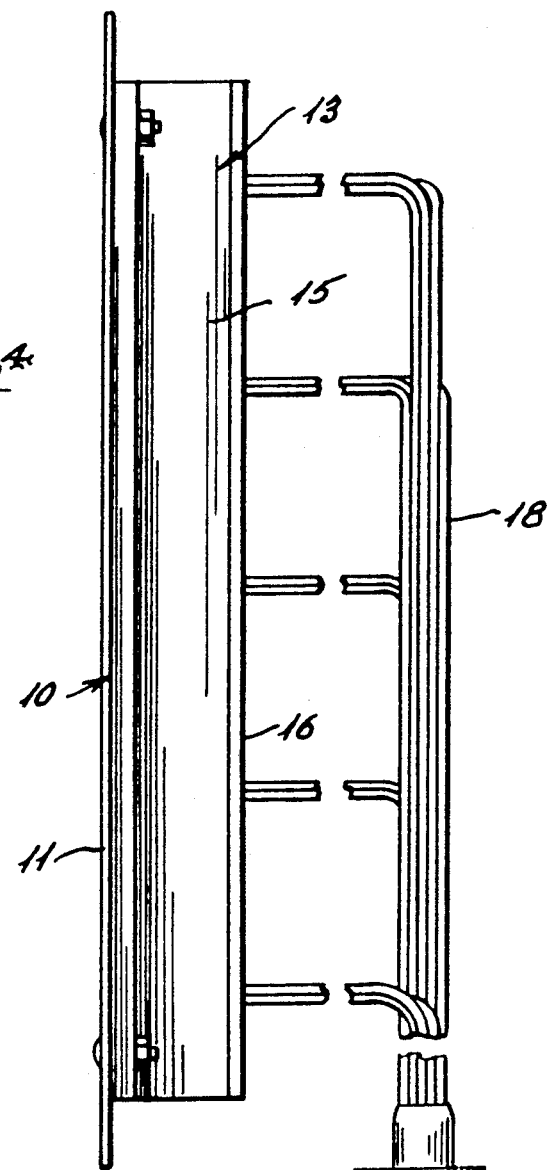
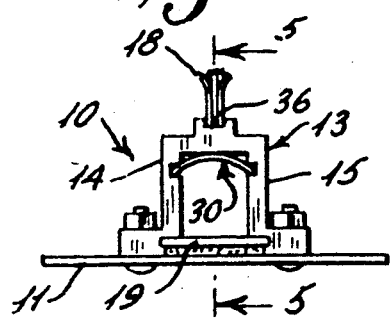
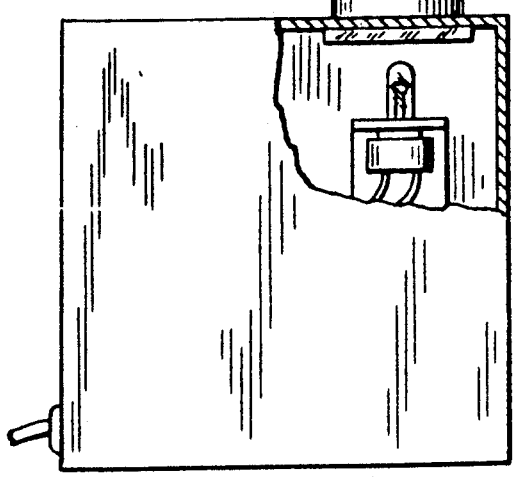

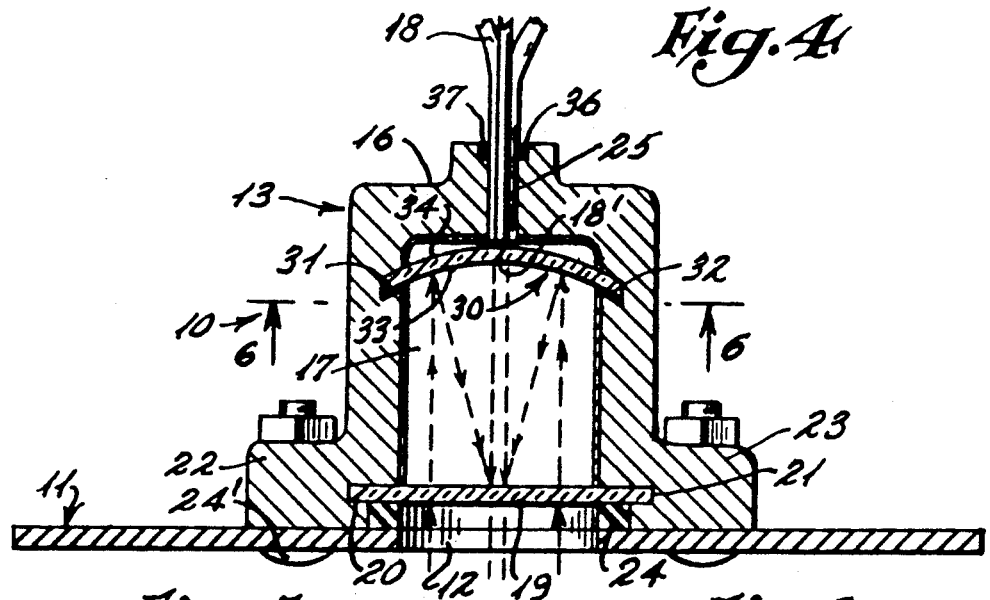
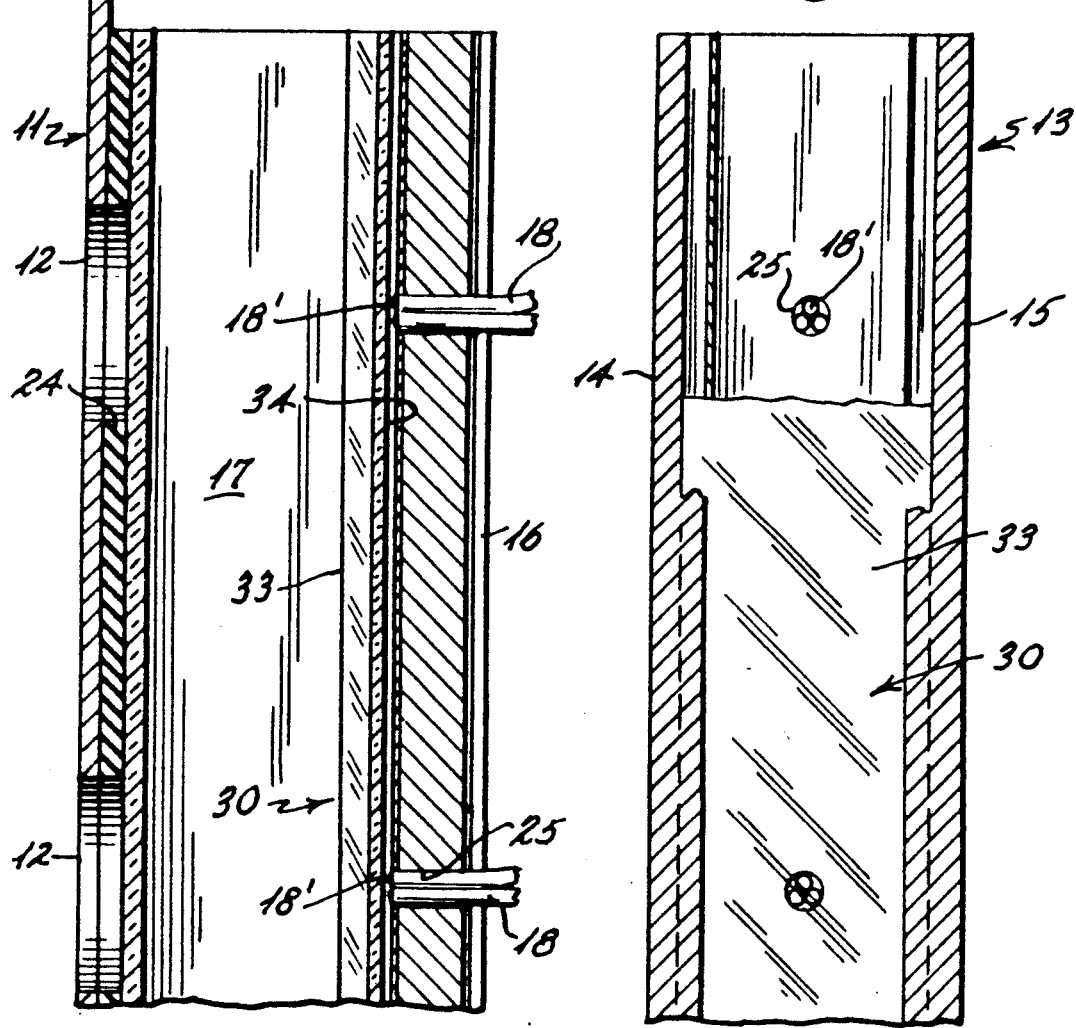

FIBER OPTIC LIGHTING SYSTEM

BACKGROUND OF THE INVENTION

1. Field of the Invention

This invention is generally directed to lighting systems and more specifically to fiber optic lighting systems wherein a plurality of fresnel lenses are mounted within spaced openings provided in a front panel of a sign, signal or other light fixture housing and are spaced from the light emitting tips of one or more fiber optics that are mounted through a rear wall of the housing. The fiber optics are mounted through small openings provided in the rear wall of the housing and are positioned and aligned within the housing using a polycarbonate plastic shield. The one or more fiber optics may be generally aligned with and are within the focal distance of each of the opposing fresnel lenses so that either one or a plurality of light sources may be emitted through the fresnel lenses from the optical fibers. In the invention, the polycarbonate shield not only functions to align the fibers and prevent their further penetration relative to the spaced fresnel lenses but also reduces the amount of ultraviolet energy which is allowed to concentrate on the ends of the fiber optics from light entering through the fresnel lenses during periods of low ambient or natural sun angle. In some instances, it is possible that the plastic shield may be colored so as to filter the light being emitted to the lenses from the optical fibers. The plastic shield also works as a specular reflector for light which reflects off the interior surfaces of the fresnel lenses within the housing as each of the shields is formed having an arcuate or concave outer surface which opposes each of the lenses.

The lighting system of the present invention is particularly adaptable for use in commercial environments for signs and backlighting and especially highway signs which are exposed to sunlight wherein the ambient light directed towards the face of a sign will vary in incident angle depending on the time of day. By mounting the fresnel lenses recessed relative to the front of the signs or signals the lenses become self-shaded thereby reducing the requirement to provide separate shade elements which are incorporated with many conventional highway signals and signs while still allowing the light emitted from the signs, signals or housings, through the fresnel lenses, to be sufficiently intense to permit the use of the lighting systems even when low sun or other ambient light angles are encountered.

The fiber optic mountings utilized with the light systems of the present invention may further include structures which will enable the accurate retention of the fiber optics relative to the lenses associated with each lighting system.

2. History of the Related Art

The use of fiber optics in lighting systems is well known and has gained in commercial acceptance and usage over the past 10–15 years. An advantage of such systems is that light may be conducted from a remote source to a plurality of different areas utilizing individual light fibers which extend from the source to a point of light emission which may be at some distance from the light source. Utilizing such systems, a plurality of fiber optics may be associated with each light source.

Fiber optics have also been used for visual communication in traffic control. In western Europe, such fiber optic signs have been utilized to control pedestrian traffic and have been incorporated into signs which indicate to the pedestrian to either "walk" or "don't walk". In addition, such signs have been utilized for highway lane control by providing "X's" or "arrows" to direct or prohibit vehicular traffic in a given area.

Fiber optic signs were originally introduced based on the theory that they could provide brighter point source light illumination because of the inherent directional light output characteristics associated with fiber optic strands. Further, with the directional light emitting characteristics of fiber optics, it was theorized that the light images would be intense enough to permit distinction between closely spaced, discrete point sources of light. A further advantage believed of such systems was that the light sources could be easily replaced without having to replace the fiber optics themselves and thereby reduce maintenance in repair of signs, signals and other light systems incorporating fiber optics.

Unfortunately, to date, most such fiber optic signs have not provided directionalized light output which is sufficiently intense and clear so as to provide messages which are not mottled in appearance. Most conventional fiber optic highway type signs utilize glass fibers which are often inconsistent in the degree of light transmission from one fiber to another. Further, due to the small size of glass fibers, many fibers would have to incorporated in a single lens system. As glass fibers are inherently brittle, a great deal of expense is required to ensure the proper and safe mounting within a sign or optical system such as to protect against vibrations which could adversely affect the integrity of the fiber optics associated therewith.

As a result of the foregoing, in many conventional type fiber optic signs or lighting systems, the light intensity which is emitted from the system is not intense enough especially when ambient light conditions are such that a low angle of incoming light is directed upon the face of the lens system associated therewith. Under some conditions, such as when the fiber optics are used in highway or pedestrian control signs or signals, poor lighting intensity could be hazardous as pedestrians as well as motorists would not be able to easily discern messages being displayed.

Another problem inherent in conventional fiber optic sign or signal systems is that over a period of time the amount of ultraviolet light which impinges upon the fibers or the heat developed within the interior of such signs will adversely affect the fiber optics thereby further reducing the intensity of light which is emitted. Such a reduction in light intensity requires increased maintenance of such light systems which is undesirable and not cost effective. Also, in order to properly shade conventional fiber optic signs and light systems against low incident ambient sunlight, it is frequently necessary to provide separate awnings or shades which will reduce the amount of light which can enter into the lenses associated with such systems to ensure that sufficient illumination is maintained.

SUMMARY OF THE INVENTION

This invention is directed to a fiber optic lighting system which is particularly adapted for commercial uses and may be incorporated into signs including highway signs and signals which are exposed to ambient sunlight wherein the system incorporates a housing having a front panel mounted to a channel element which provide support for a unique lens system. A plurality of spaced openings are provided through the front panel of the signs or signals with fresnel lenses being mounted within the openings in recessed relationship from the front face thereof. Light is directed to the rear of each fresnel lens by one or more optic fibers which have their light emitting ends mounted through small openings through the rear of the channel element of the sign or signal housing. At least one fiber is aligned in space relationship with each fresnel lens. Proper alignment of each fiber optic is assured by providing a polycarbonate barrier or shield which is mounted within the housing against which each fiber optic abuts so that each fiber is spaced at the proper focal distance of the associated opposing fresnel lens. Each polycarbonate strip is further arcuately formed to thereby present a concave shape toward the rear surface of each fresnel lens so as to act to divert or reflect ultraviolet light which may pass through the lenses during periods of low angle sunlight incidence.

To ensure that each fiber optic is securely mounted within a sign, signal or housing, a groove is provided along the rear of the channel element in communication with each opening therethrough. An appropriate adhesive material is selectively introduced within the groove about each fiber optic to thereby securely unite the fibers to the housing or signs so that such fibers cannot be accidently displaced with respect thereto.

The remote end of each of the fiber optics is oriented adjacent one or more light sources and in some embodiments a variety of color filters may be placed intermediate a light source and the remote ends of the fibers to establish color patterns through each of the fresnel lenses associated with the lighting system. In other embodiments, the polycarbonate shield mounted within the housing of the lighting system may be colored so that all light transmitted through such shields will have a predetermined light characteristic.

It is a primary object of the present invention to provide a fiber optic lighting system which may be suitable for use in ambient sunlight for highway and pedestrian signs and signals wherein the light emitted from the lighting system will be sufficiently intense to allow the safe use of such signs or signals even in periods of low incident sunlight.

It is another object of the present invention to provide a fiber optic lighting system which is designed to prevent ultraviolet deterioration of the light emitting fibers associated with the lighting systems to thereby prolong the life of the lighting systems without reduction in light intensity.

It is yet a further object of the present invention to provide a fiber optic lighting system wherein the orientation of the fiber optics with respect to a plurality of fresnel lenses associated with the system is ensured by providing a transparent plastic shield which is mounted within the lens mounting housing and against which the free or light emitting ends of the fiber optics will abut when installed relative to the lenses associated with the system. The lighting system also incorporates a housing which permits each of the optical fibers to be secured by adhesive once they have been aligned with respect to the lenses of the system to thereby prevent the accidental displacement of the fiber optics relative to the lenses of the lighting system.

It is also an object of the present invention to provide a fiber optic lighting system wherein a plurality of light emitting fiber optics may be associated with each of a plurality of lenses associated with the system with separate light sources being associated with the fiber optics so that a plurality of colors may be emitted from the lenses depending upon which light source is activated.

It is another object of the present invention to provide a fiber optic lighting system which may be utilized for highway signs and traffic and pedestrian control wherein the signs incorporate fresnel lenses which may be exposed to ambient light conditions and wherein the light intensity emitted from the lenses will be sufficient during all hours of daylight to ensure the safe use of the signs for pedestrian and traffic control.

It is also an object of the present invention to provide a fiber optic lighting system which will reduce the maintenance required to ensure the proper operating characteristics of the lighting system even after long periods of operation in ambient sunlight conditions.

BRIEF DESCRIPTION OF THE DRAWINGS

FIG. 1 is a front plan view of a simplified housing for a fiber optic lighting system made in accordance with the teachings of the present invention.

FIG. 2 is a top plan view of the embodiment of FIG. 1.

FIG. 3 is a side elevational view having portions broken away of a fiber optic lighting system as shown in FIG. 1.

FIG. 4 is an enlarged cross-sectional view taken along lines 4—4 of FIG. 1 and showing the fiber optics mounted within the housing of the present invention and relative to a polycarbonate shield and fresnel lens.

FIG. 5 is a cross-sectional view taken along lines 5—5 of FIG. 4.

FIG. 6 is a cross-sectional view taken along lines 6—6 of FIG. 4 having portions broken away.

DESCRIPTION OF THE PREFERRED EMBODIMENT

Figure 7:
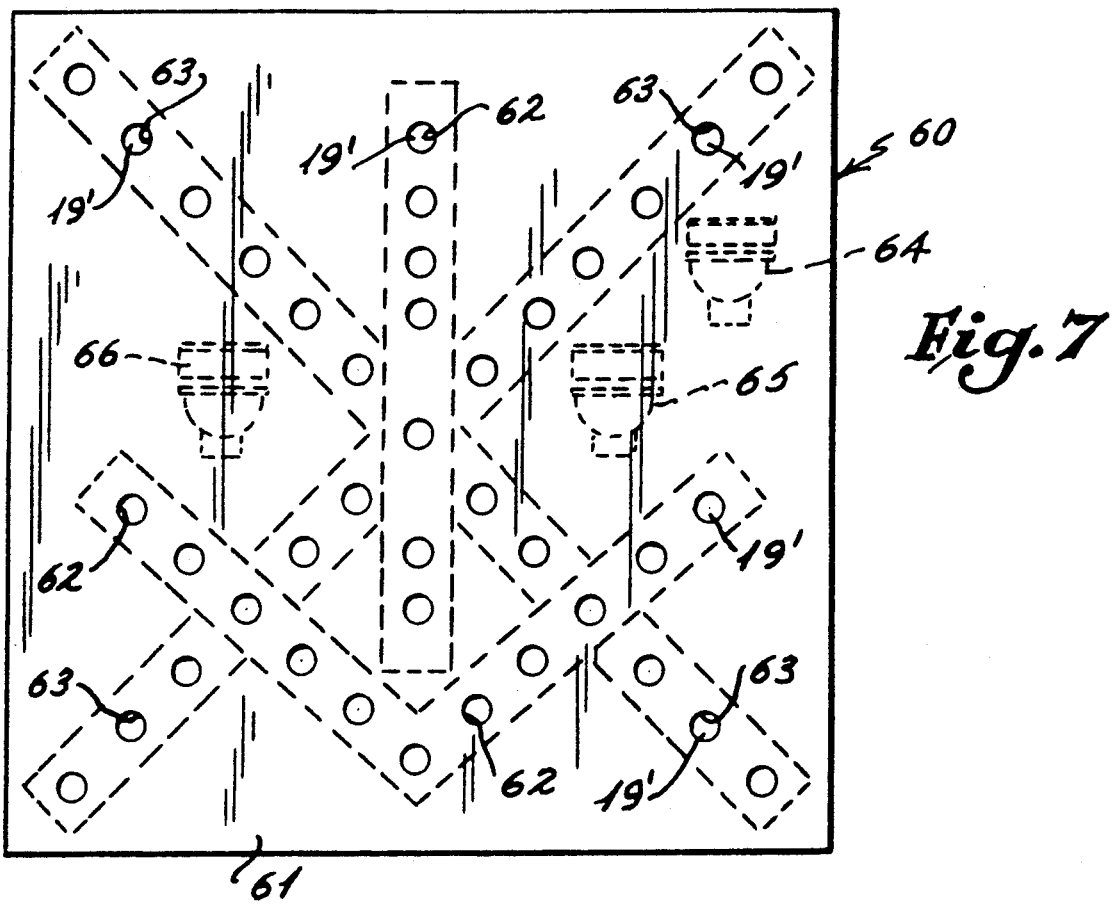
FIG. 7 is a front plan view of one illustration of a traffic sign incorporating the lighting system of the present invention.
Figure 8:
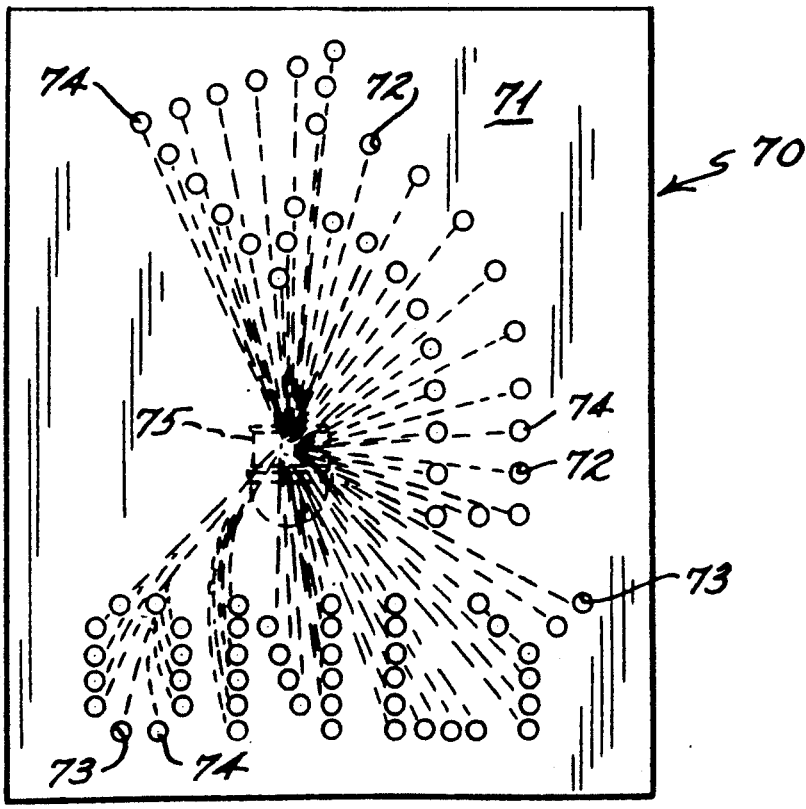
FIG. 8 is a front plan view of a second embodiment of traffic sign incorporating the teachings of the present invention.

With continued reference to the drawings, the fiber optic lighting systems of the present invention will be described with respect to FIGS. 1-6 which reflect a basic lens mounting system which reflects the essential characteristics of the fiber optic lighting system. It should be noted that the elements shown in FIGS. 1-6 may be incorporated into various types of signs or commercial lighting displays or lighting for aircraft and commercial vehicles and the like. The simplistic housing structure is shown for purposes of illustration so as to describe the orientation between the fiber optics and the lenses associated with any system or sign which will incorporate the essential characteristics of the present invention. FIGS. 7 and 8 are shown as two examples of highway signs or signals incorporating the features of the invention and are presented for purposes of illustration, it being realized that any type of configuration of sign, signal or other lighting system or display may be created utilizing the teachings of the present invention.

Figure 9:
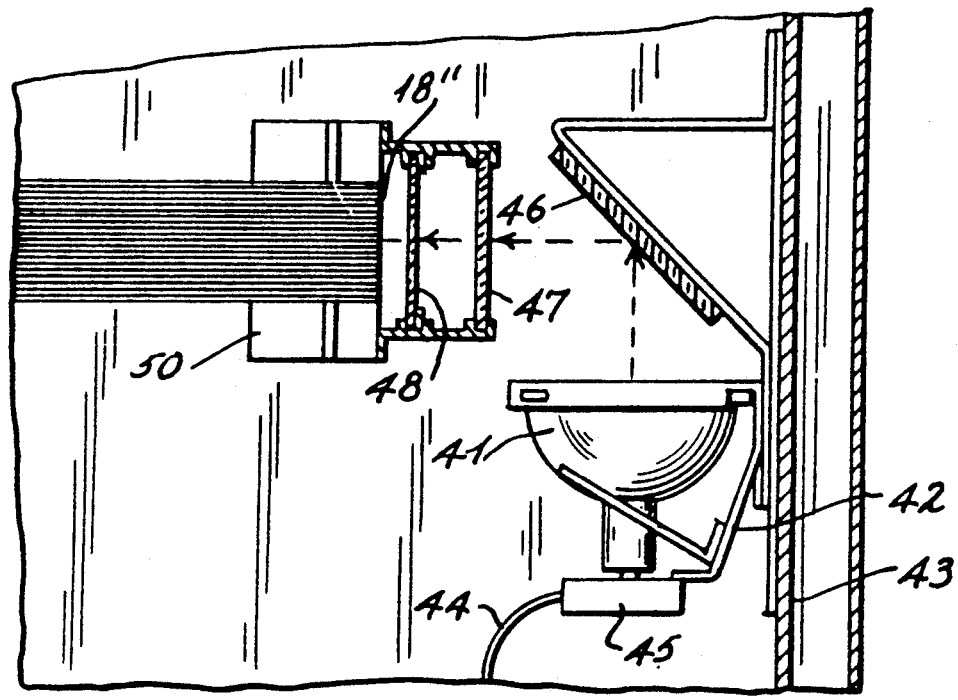
FIG. 9 is cross-sectional view showing a first light source which may be utilized with the fiber optic systems of the present invention to supply light to the fiber optics associated with the signs shown in FIGS. 7 and 8.
Figure 10:
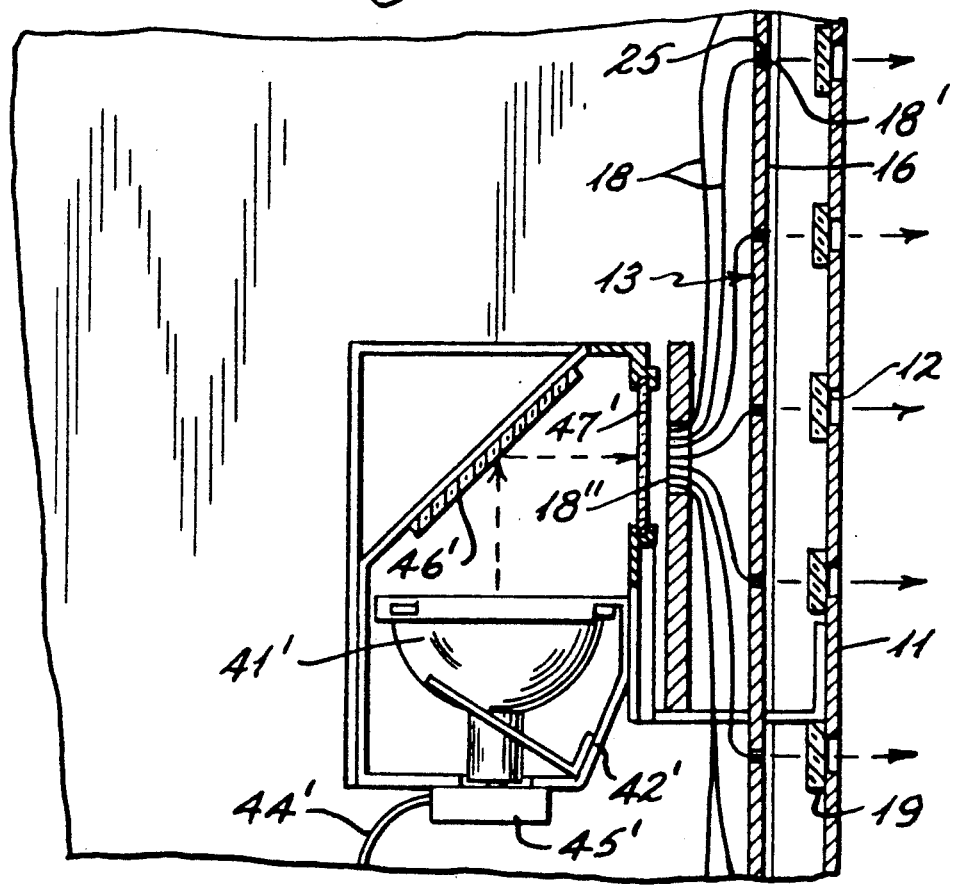
FIG. 10 is a second embodiment of light source which may be incorporated into a sign such as disclosed in FIGS. 7 and 8.

In addition to the foregoing, the light sources disclosed in FIGS. 9 and 10 are also exemplary of a plurality of different light sources which may be utilized with the present invention and are not to be considered limiting in nature.

In FIGS. 1-6, the fiber optic lighting system incorporates a lens mounting housing 10 having a front cover or panel 11 having a plurality of openings 12 therein. The remaining portion of the housing is shown especially in FIG. 4 as being a generally U-shaped channel element 13 having spaced sidewalls 14 and 15 and a rear wall 16. The channel element defines an elongated interior cavity 17 through which light from a plurality of fiber optics 18 may be transmitted to fresnel lenses 19 which are mounted within opposing recesses 20 and 21 formed on the outermost portions 22 and 23 of the side walls 14 and 15. The front panel 11 may be secured by appropriate fasteners 24 to each of the portions 22 and 23 of the channel element so that the panel 11 may be removed in order to allow access to the fresnel lenses 19. The lenses 19 are preferably linear fresnel lenses.

It should be noted that the opposing recesses 20 and 21 which provide for the mounting of the fresnel lenses are recessed or spaced inwardly with respect to the panel 11. Utilizing this structure, during periods of varying degrees of ambient incident light relative to the front panel 11 of the housing 10, the recessed areas will provide shading for low incident angle sunlight and thereby reduce the amount of ultraviolet light which is allowed to pass through the fresnel lenses and further will ensure high intensity light being emitted from the fresnel lenses forwardly of the front panel 11.

To protect each of the fresnel lenses against accidental damage due to vibration of the housing, and to prevent the penetration of water or other materials into the housings, a resilient seal 24 is provided between the panel 11 and each of the fresnel lenses 19.

With specific reference to FIG. 4 of the drawings, a pair of optical fibers 18 are showing as being disposed through one of a plurality of spaced openings 25 formed in the rear wall 16 of the channel element 13. In some instances, only a single fiber optic 18 will extend through an opening 25 and therefore the size of the opening 25 may vary from one lighting system to another In other embodiments, three or more optical fibers may be associated with each opening 25.

The free ends or light emitting ends 18' of each of the fiber optics 18 are shown as being somewhat rounded. It is further preferred that the optical fibers be made from acrylic or plastic fibers as opposed to glass fibers. Utilizing the acrylic fibers, the diameter of each fiber is significantly greater than glass fibers thereby conducting a greater degree of light. For instance, a single acrylic plastic fiber may have a diameter of 0.060" whereas a conventional glass fiber may have a diameter of 0.002". Thus, it would take many more glass fibers to provide the same light output and intensity which is achieved with a single acrylic plastic fiber. Further, utilizing acrylic plastic fibers reduces the required maintenance and the possibility of damage to the fibers due to vibration associated with signs, signals or other lighting systems during their use.

One further benefit associated with the lens system of the present invention is that the light emitted from the free ends 18' of each of the fiber optics will be emitted in an outwardly diverging beam of approximately 60 degrees. This angle varies from the conventional 22 degrees light emittance angle associated with conventional glass fibers. Therefore, utilizing the present system, the fresnel lenses actually function to concentrate or converge the beam emitted from the fiber optics 18 outwardly of the housing. In conventional fiber optic signs, the light beams are actually spread or diverged from the lens system thereby reducing intensity whereas through the convergence of light, the present invention increases intensity.

In order to properly position each of the light emitting ends 18' of the fiber optics 18 relative to the rear surface of the fresnel lenses 19 one or more transparent polycarbonate shields or strips 30 are mounted intermediate the fiber optics and the fresnel lenses. As shown in FIG. 4, a pair of opposing slots or grooves 31 and 32 are provided in the inner portions of the side walls 14 and 15 of the channel element 13. The slots are formed generally adjacent the rear wall 16 and serve to receive the outer ends of the polycarbonate shields. In the preferred embodiment, the polycarbonate material is a LEXAN strip which is formed so that the surface 33 thereof which opposes the rear surface of the fresnel lenses is concave in configuration. It is important to provide the concave configuration so that the strip acts as a specular reflector for the light which bounces off the interior surface of the fresnel lens. The radius of curvature of the polycarbonate strip is centered on the fresnel lens aperture thereby ensuring maximum light intensity through the fresnel lens and forwardly of the front panel 11 of the housing. The LEXAN strip also serves to restrict the inner movement of the fiber optics 18 as the ends 18' thereof will abut the rear surface 34 and prevent the further penetration of the fiber optics relative to the fresnel lenses. In this manner, an exact orientation of each of the ends 18' of each fiber optic 18 is assured.

To secure each of the fiber optics relative to the channel element 13, a groove 36 is formed in the rear wall 16 so as to communicate with each of the openings 25 therein. After the fiber optics 18 have been inserted through the openings 25 so as to engage the rear surface 34 of the LEXAN strips 30, an adhesive material such as shown at 37 may be introduced into the channel 36 to thereby secure each of the fiber optics in fixed relationship to the channel element. In this manner, the inadvertent movement or removal of any of the fiber optics 18 is effectively prevented.

In the preferred embodiment, the channel element 13 is preferably formed of an extruded PVC material so that the rear and side walls are integral. Further, the slots or grooves in which the fresnel lens and LEXAN retainers are mounted may be simultaneously formed with the extrusion. The front panel 11 of the housing is preferably formed of an aluminum material having the openings punched therein in spaced relationship with respect to one another as may be desired. The fresnel lenses preferably have linear array lenses and are formed of a plastic material having ultraviolet inhibitors molded therein so as to filter out ultraviolet light which could otherwise pass through the lens and toward the ends 18' of the fiber optics 18.

With reference to FIGS. 9 and 10 of the drawings, two examples of light sources which may be utilized with the lighting systems of the present are shown in greater detail. In each embodiment, it is assumed that the light sources are mounted within a sign cabinet 40 wherein the front wall of the cabinet would be covered by a panel similar to panel 11 having the fiber optic bundles secured relative to the fresnel lenses as previously described. In FIG. 9, a lamp 41 is mounted by bracket 42 to the rear wall 43 of the sign cabinet. The lamp may be of any conventional type with the one being shown as being generally indicative of a 42 watt lamp having an 8,000 hour life expectancy. The lamp is provided with a source of power from an electrical line 44 which is connected to the base 45 forming the electrical socket for the lamp. Light emitted from the lamp is directed to a wide band dichroic cold mirror 46 which is mounted at an angle of incidence of approximately 45 degrees with respect to the light being emitted from the lamp 41. Light reflected from the mirror 46 passes through a wide band dichroic hot mirror 47 having a normal angle of incidence and thereafter is passed through a dichroic color filter 48 which includes a heat resistant glass material. Light in passing through the color filter 48 is directed against the remote ends 18" of the fiber optics 18 which are mounted within a bushing element 50. Light is thereafter transmitted through the fiber optics to the light emitting ends 18' through which are mounted in relationship to each of the fresnel lenses associated with a given lighting system as was previously described. By use of dichroic optical filters, it is possible to effectively filter heat and harmful ultraviolet components out of the light emitted from the lamp 41. This permits sources of light having several thousand watts per square foot to be utilized with the fiber optics of the present invention without degradation of the fiber optics. This is important to ensure the longevity and maintenance-free characteristics of the lighting system of the present invention.

Varying number of light sources which include the lamps, mirrors and filter discussed above may be utilized in a given lighting system. In the case where the lighting system of the present invention is to be utilized as a conventional stoplight, three such light sources would be utilized with color filters being used being of red, green and yellow. Control means would be incorporated into the sign to alternately control the power supplied to the various lamps 41 to ensure the proper indication being emitted from the front of the sign during use.

In FIG. 10, a similar light source is disclosed as was discussed above with respect to FIG. 9 with the exception that the light source is mounted generally adjacent to the rear wall 16 associated with the channel element 13 of the lighting system. As with the previous embodiment, the light source includes a lamp 41' mounted to a socket 45' which receives electrical energy from input line 44'. The lamp is mounted to a bracket assembly 42' adjacent the rear wall of the channel element 13. Light emitted from the lamp 41' is directed against a first cold mirror 46' which is angled at approximately 45 degrees and directs light towards a hot mirror 42' which is oriented generally normal to the angle of incidence of the reflected light. After passing through the hot mirror 47' the light may pass through a color filter (not shown) and to the inner ends 18" of the fiber optics. Light is thereafter transmitted to the ends 18' of each of the fiber optics and is emitted towards the fresnel lenses 19 and outwardly with respect to the front panel 11 of the sign.

With reference to FIGS. 7 and 8, two examples of highway signs are disclosed which incorporate the teachings of the present invention. In FIG. 7 the sign cabinet 60 includes a generally square front panel 61 which replaces the front panel 11 described with respect to the embodiment of the invention shown in FIGS. 1-6. A plurality of first openings 62 are provided in spaced relationship through the surface of the panel 61 so as to define an outline of an arrow. A plurality of second spaced openings 63 are provided to form an "X". Mounted to the rear surface of the panel 61 are a plurality of channel elements 13' some of which may intersect with one another so as to form the overlapping pattern of the arrow and cross symbols. Fresnel lenses 19' are mounted with each of the openings 62 and 63 and are recessed, as was discussed with respect to the embodiment of FIGS. 1-6 with respect to the surface of the panel 61 of the sign cabinet 160. Light from the light sources 64, 65 and 66 is directed through the various filters and mirrors and the fiber optic bundles which are associated therewith and to each of the fresnel lenses 9'. By selective control of the lamps 64-66 either the arrow or cross sign may be illuminated in any one of three different colors.

It should be noted that in some instances, such as where a given sign is to be illuminated always in a single color, a separate light filter element need not be provided and the color transmitted to each of the fresnel lenses may be created by coloring the polycarbonate strip which is associated with each optical fiber. This would reduce the cost of the overall sign.

In FIG. 8, a traffic sign 70 is disclosed which includes a front panel 71 having a first plurality of openings 72 form therein which define the outline of an angled arrow. Secondary openings 73 are also formed therein which spell out the word "ONLY" In this embodiment, the shape of the channel elements for the lighting system would be altered from that disclosed in FIGS. 1-6 which housing was shown as being generally straight. In this embodiment, the channel element of the sign housing would have to be formed so as to coincide with the general shape of the front panel 71. A larger polycarbonate strip would thereafter be placed through the intermediate portion of the sign housing with the openings in the rear surface of the housing being selectively placed so as to align the fiber optics extending therethrough with the lenses 74 which would be mounted within each of the openings 72 and 73. In the drawing figure, a single light source 75 is shown as providing light not only for the arrow but also for the word symbol "ONLY".

In view of the foregoing, it should be noted that various lighting fixtures and configurations for traffic signs and signals and other commercial signs may be manufactured utilizing the teachings of the present invention. In addition, it is theorized that various decorative lighting might also be developed utilizing the teachings of the present invention with the light intensities being achievable being enhanced over conventional fiber optic lighting systems. Further, it is believed that the lighting systems in the present invention will provide more economical systems by reducing the amount of maintenance required to maintain each sign.

What is claimed is:

1. A fiber optic lighting system comprising a housing, said housing having a front panel and rear wall portion, a plurality of spaced first openings in said front panel and a plurality of spaced second openings in said rear wall portion, each of said second openings being aligned with one of said first openings, at least one optical fiber mounted through each of said second openings, each optical fiber having a light-receiving end and a light emitting end, said light emitting ends extending through said second openings, a fresnel lens mounted within each of said first openings, a transparent plastic shield means disposed within said housing and intermediate said lenses and said light emitting ends of said optical fibers, a source of light for illuminating said light-receiving ends of said optical fibers whereby light emitted from said light emitting ends of said optical fibers passes through said shield means and said lenses, and means for securing each of said optical fibers to said housing so that said light emitting ends thereof are spaced within the focal length of said fresnel lenses.

2. A fiber optic lighting system comprising a housing, said housing having a front panel and rear wall portion, at least one first opening in said front panel, at least one second opening in said rear wall portion so as to be generally aligned with said first opening, a lens mounted within said first opening, at least one optical fiber having a light-receiving end and a light emitting end, said light emitting end extending through said second opening in said rear wall portion of said housing, a transparent plastic shield means disposed within said housing and intermediate said lens and said light emitting end of said optical fiber, said shield means including a film strip having front and rear surfaces, said front surface being generally concave and oriented toward said lens whereby said shield means will tend to reflect light within said housing toward said lens, and a source of light for illuminating said light-receiving end of said optical fiber whereby light emitted from said light emitting end of said optical fiber passes through said shield means and said lens.

3. The fiber optic lighting system of claim 2 in which said light emitting end of said optical fiber engages said rear surface of said shield means.

4. The fiber optic lighting system of claim 3 in which said shield means is a polycarbonate plastic material.

5. The fiber optic lighting system of claim 4 in which said polycarbonate plastic material is LEXAN.

6. The fiber optic lighting system of claim 3 including means to secure said optical fiber in relationship to said shield means and said lens within said housing.

7. The fiber optic lighting system of claim 6 in which said rear wall portion includes inner and outer surfaces, said means to secure said optical fiber including a groove formed in said outer surface of said wall, said second opening in said rear wall being oriented within said groove, and adhesive means within said groove for securing said optical fiber extending through said second opening.

8. The fiber optic lighting system of claim 7 in which said front panel has inner and outer surfaces, said lens being mounted in recessed relationship with respect to said outer surface on said front panel.

9. The fiber optic lighting system of claim 8 in which said lens is a fresnel lens which will at least partially converge the light passing therethrough from said light emitting end of said optical fiber.

10. The fiber optic lighting system of claim 9 in which said fresnel lens includes an ultra-violet inhibiting material therein.

11. The fiber optic lighting system of claim 9 in which said source of light includes a lamp means, a first cold mirror means for initially reflecting light from said lamp means and a second hot mirror means for receiving light reflected from said first cold mirror means.

12. The fiber optic lighting system of claim 11 in which said first cold mirror means and said second hot mirror means are wide band dichroic mirrors.

13. The fiber optic lighting system of claim 11 including at least one color filter means disposed between said second hot mirror means and said light receiving end of said optical fiber.

14. A fiber optic lighting system comprising a housing, said housing having a front panel and rear wall portion, at least one first opening in said front panel, at least one second opening in said rear wall portion so as to be generally aligned with said first opening, a fresnel lens mounted within said first opening, at least one optical fiber having a light-receiving end and a light emitting end, said light emitting end extending through said second opening in said rear wall portion of said housing, a transparent plastic shield means disposed within said housing and intermediate said fresnel lens and said light emitting end of said optical fiber, said shield means including front and rear surfaces, said light emitting end of said optical fiber engages said rear surface of said shield means, means for securing said optical fiber with respect to said shield means and said fresnel lens, and a source of light for illuminating said light-receiving end of said optical fiber whereby light emitted from said light emitting end of said optical fiber passes through said shield means and said lens.

15. The fiber optic lighting system of claim 14 in which said front panel includes inner and outer surfaces, said fresnel lens being mounted in recessed relationship to said outer surface of said front panel.

16. The fiber optic lighting system of claim 15 in which said shield means is a polycarbonate plastic material, said front surface of such shield means being concavely curved toward said lens.

17. The fiber optic lighting system of claim 14 in which said housing includes a pair of side walls, a pair of opposing slots formed in said side walls and spaced from said rear wall thereof, and said shield means being mounted within said first pair of opposing slots.

18. The fiber optic lighting system of claim 17 including a pair of recesses formed in said side walls adjacent said front panel, said lens being mounted within said recesses so as to be spaced with respect to said opening in said front panel.

* * * * *